United States Patent
Zhang et al.

(10) Patent No.: US 12,117,885 B2
(45) Date of Patent: Oct. 15, 2024

(54) ELECTRONIC DEVICE POWER CONSUMPTION GRADING

(71) Applicant: Seagate Technology LLC, Fremont, CA (US)

(72) Inventors: Li Hong Zhang, Singapore (SG); Mark A. Gaertner, Minneapolis, MN (US)

( * ) Notice: Subject to any disclaimer, the term of this patent is extended or adjusted under 35 U.S.C. 154(b) by 184 days.

(21) Appl. No.: 17/563,823

(22) Filed: Dec. 28, 2021

(65) Prior Publication Data

US 2023/0205302 A1    Jun. 29, 2023

(51) Int. Cl.
  *G06F 1/32*     (2019.01)
  *G06F 1/3234*   (2019.01)

(52) U.S. Cl.
  CPC .................. *G06F 1/3268* (2013.01)

(58) Field of Classification Search
  CPC .................................................. G06F 1/3268
  See application file for complete search history.

(56) References Cited

U.S. PATENT DOCUMENTS

| | | | |
|---|---|---|---|
| 8,284,627 B2 * | 10/2012 | Belluomini | G06F 1/3268 713/320 |
| 8,472,183 B1 | 6/2013 | Ross et al. | |
| 9,116,897 B2 | 8/2015 | Rowan et al. | |
| 9,552,174 B2 | 1/2017 | Powell | |
| 9,575,539 B2 | 2/2017 | Kansal et al. | |
| 9,939,868 B2 | 4/2018 | Shuster et al. | |
| 10,216,440 B2 | 2/2019 | Chen et al. | |
| 10,516,268 B2 | 12/2019 | Khaitan et al. | |
| 10,545,194 B2 | 1/2020 | Eldridge et al. | |
| 10,956,082 B1 | 3/2021 | Chen et al. | |
| 11,109,805 B1 | 9/2021 | Miller et al. | |
| 2011/0137592 A1 * | 6/2011 | Kim | G01R 21/1338 702/62 |
| 2013/0304869 A1 * | 11/2013 | Gupta | G06F 21/554 709/219 |
| 2014/0108828 A1 * | 4/2014 | Breternitz | G06F 1/329 713/300 |
| 2014/0281610 A1 * | 9/2014 | Biswas | G06F 1/324 713/322 |

(Continued)

OTHER PUBLICATIONS

Brousard, Early And Fine Virtual Binning, Sep. 8, 2020, https://semiengineering.com/early-and-fine-virtual-binning/ (Year: 2020).*

(Continued)

*Primary Examiner* — Mark A Connolly (57) ABSTRACT

Systems and methods are disclosed for electronic device power consumption grading. In some examples, similar electronic devices may consume different amounts of power due to variations in components of the electronic devices. The components can include electrical components (e.g., discrete circuits, integrated circuits, etc.), mechanical components (e.g., motors, traces, etc.), electro-mechanical components (e.g., switches, motors, piezoelectric devices, etc.). Power consumption information for specific components can be determined and a power consumption grading for the specific electronic device can be determined from the power consumption information. A user may then utilize the power consumption grading to optimize a usage of the electronic device.

20 Claims, 4 Drawing Sheets

(56) References Cited

U.S. PATENT DOCUMENTS

| | | | | |
|---|---|---|---|---|
| 2016/0313394 | A1* | 10/2016 | Arsovski | G01R 31/2894 |
| 2018/0232113 | A1* | 8/2018 | Ham | G06F 1/329 |
| 2022/0137854 | A1* | 5/2022 | Lang | G11C 29/023 |
| | | | | 711/154 |
| 2022/0300062 | A1* | 9/2022 | Goel | G06F 1/329 |

OTHER PUBLICATIONS

Andrew Binstock; Measuring HDD Power Usage with Newer Tech Universal Adapter, Greener Computing; Oct. 2007; 2 pages.
ASIC—System on Chip—VLSI Design: Leakage Power Trends; https://asic-soc.blogspot.com/2008/03/leakage-power-trends.html; 8 pages.
Enterprise vs. Desktop Hard Drives—5 Notable Differences; Newegg Business Smart Buyer; https://www.neweggbusiness.com/smartbuyer/storage/enterprise-vs-desktop-hard-drives-5-notable differences/; 5 pages.
EXOS Enterprise Data Sheet; Seagate; Sep. 2017; 8 pages.
Goldheart, et al,; Choosing a Hard Drive; iFixit; https://www.ifixit.com/Wiki/Choosing_a_Hard_Drive; 4 pages.
Power Consumption Summary for K2E System-on-Chip (SoC) Device Family: Texas Instruments; Application Report, SPRAC75, Jun. 2017; 8 pages.
WD Hard Drive Color Codes: Black, Blue, Green, and Red; Western Digital; https://www.westerndigital.com/solutions/compare-our-color-drives; 9 pages.
WD Hard Drive Color Differences—Blue, Green, Black, Red, Purple; Western Digital; https://www.unifore.net/product-highlights/wd-hard-drive-color-differences-blue-green-black-red-purple/print.html; Sep. 18, 2016; 7 pages.

* cited by examiner

ELECTRONIC DEVICE POWER CONSUMPTION GRADING

SUMMARY

In certain embodiments, a method can comprise determining a power consumption indicator for one or more components of an electronic device, determining a power consumption grade from the power consumption indicator, and assigning the power consumption grade to the electronic device such that a user can utilize the electronic device based on the power consumption grade.

In certain embodiments, a method can comprise receiving an electronic device with a power consumption grade from a supplier, and implementing a usage of the electronic device based on the power consumption grade.

In certain embodiments, a method can comprise determining a power consumption grade of an electronic device by determining a power consumption of one or more individual components of the electronic device.

DETAILED DESCRIPTION

In the following detailed description of certain embodiments, reference is made to the accompanying drawings which form a part hereof, and in which are shown by way of illustration of example embodiments. It is also to be understood that features of the embodiments and examples herein can be combined, exchanged, or removed, other embodiments may be utilized or created, and structural changes may be made without departing from the scope of the present disclosure.

In accordance with various embodiments, the methods and functions described herein may be implemented as one or more software programs running on a computer processor or controller. Dedicated hardware implementations including, but not limited to, application specific integrated circuits, programmable logic arrays, logic gates, discrete electronics, system-on-chip (SoC), and other hardware devices can likewise be constructed to implement the circuits, functions, processes, and methods described herein. Methods and functions may be performed by modules or engines, both of which may include one or more physical components of a computing device (e.g., logic, circuits, processors, controllers, etc.) configured to perform a particular task or job, may include instructions (e.g., firmware or other software) that, when executed, cause a processor to perform a particular task or job, or may include any combination thereof. Further, the methods, functions, and processes described herein may be implemented as a computer readable storage medium or memory device including instructions (e.g., firmware or other software) that, when executed, cause a processor to perform the methods, functions, or processes.

While part of the discussion herein is provided with respect to data storage devices, one skilled in the art will recognize that the technologies and solutions disclosed are applicable to any electronic device for which power ratings can be beneficial, such as to optimize power usage in a larger system. The following discussion will use hard disc drives (HDDs) as an example implementation of the technologies and solutions disclosed herein.

As cloud computing and other massive data intensive grow, larger data storage capacities are needed. To solve this, many companies have deployed massive arrays of data storage servers, sometimes located in data centers. As data storage servers and data centers grow in size, the total power consumed by the servers and data centers becomes an extremely important cost. Hard disc drives (HDDs) that can be utilized in the servers can provide unit-based power consumption information as a key metric, which can then be related to the total power consumption of the server or data center. For example, the power consumption information can be used to manage and deploy HDDs in the storage cabinets to minimize the total power usage. Thus, HDD power consumption (PC) grading can be a great value to HDD customers (e.g., the server owners) who may use the information to deploy HDDs to optimize power consumption; for example, HDDs with a lower grading (higher PC) can be used for hot data or warm data, while those with higher grading (lower PC) can be used for cold data.

However, power consumption of an HDD can only be measured at the power connector using external equipment, which such setup is mainly used for failure analysis or design evaluation and is impractical for an in-field use of an HDD in a server. Therefore, there is a need to provide power consumption information for HDDs to users. Such power consumption information can be provided to users by grading the HDDs in a factory test(s) and in the field based on available metrics.

Figure 1:
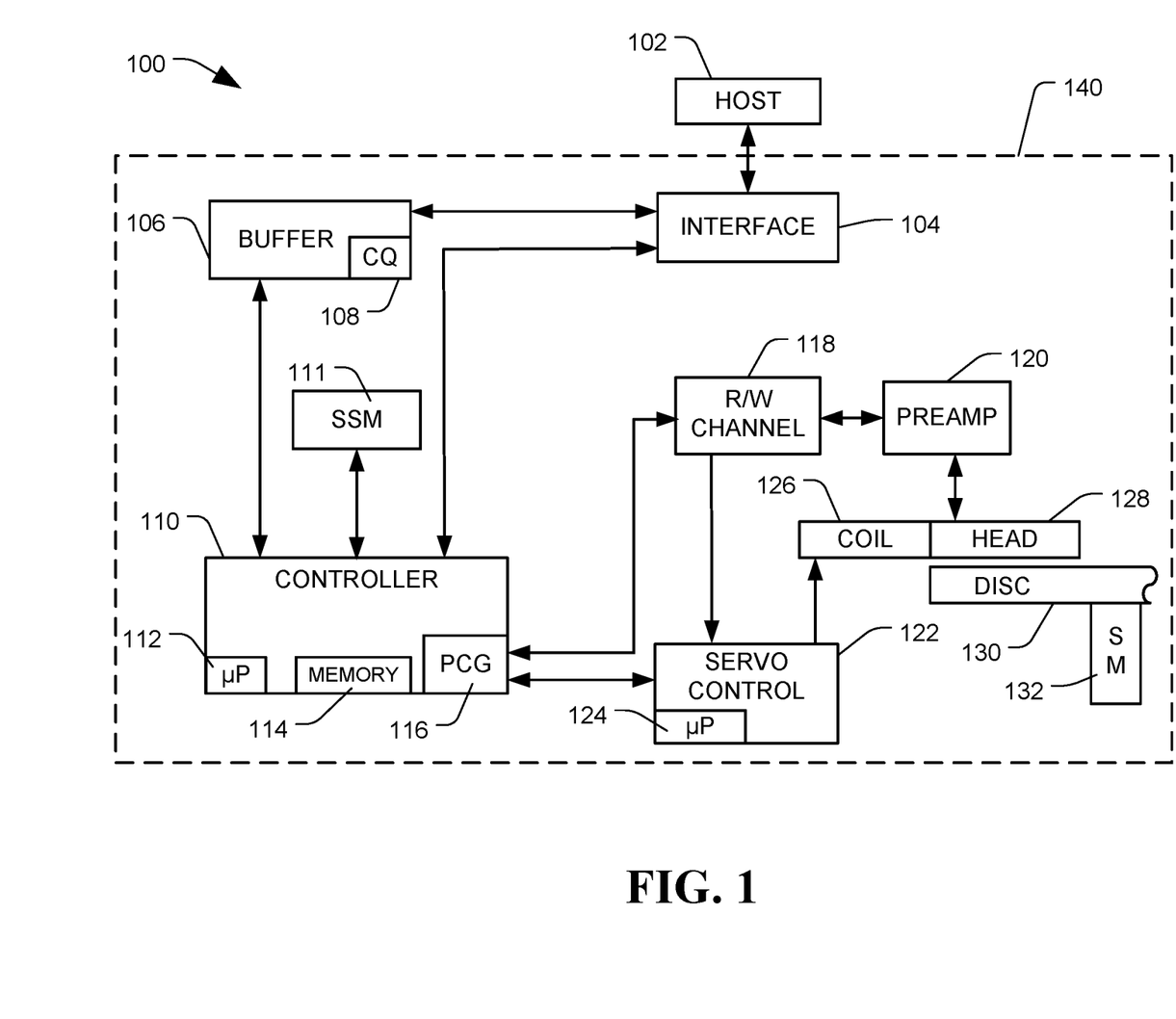
FIG. 1 is a diagram of an electronic device utilized in power consumption grading, in accordance with certain embodiments of the present disclosure.

Referring to FIG. 1, a diagram of a system 100 that includes an HDD 140 is shown, in accordance with certain embodiments of the present disclosure. Specifically, FIG. 1 provides a functional block diagram of an example HDD 140. While a single HDD is depicted, system 100 may be a server or other computer system that includes multiple HDDs.

The HDD 140 can communicate with a host device 102 (such as a server controller or other computing device) via a hardware or firmware-based interface circuit 104. The interface 104 may comprise any interface that allows communication between a host 102 and a HDD 140, either wired or wireless. The interface 104 may include a connector (not shown) that allows the HDD 140 to be physically removed from the host 102. In some embodiments, the HDD 140 may have a casing housing the components of the HDD 140, or the components of the HDD 140 may be attached to the housing, or a combination thereof. Each HDD having a separate housing may be referred to as a single HDD or a unit.

A buffer memory 106 can temporarily store data during read and write operations, and can include a command queue (CQ) 108 where multiple pending operations can be temporarily stored pending execution. Commands arriving over the interface 104 may be received in the CQ 108 or may be stored there by controller 110, interface 104, or another component.

The HDD 140 can include a programmable controller 110, which can include associated memory 114 and processor 112, as well as an interface and protocols to retrieve data from and store data to a solid state non-volatile memory 111. Memory 114 may be a dynamic random access memory (DRAM). The HDD 140 can also include a read-write (R/W) data channel 118, which can encode data during write operations and reconstruct user data retrieved from a memory, such as disc(s) 130, during read operations. A preamplifier circuit (preamp) 120 can apply write currents to the head(s) 128 and provide pre-amplification of read-back signals. A servo control circuit 122 may use servo data to provide the appropriate current to the coil 126, sometimes called a voice coil motor (VCM), to position the head(s) 128 over a desired area of the disc(s) 130 while the disc(s) 130 rotate due to a spindle motor 132. The controller 110 can communicate with a processor 124 to move the head(s) 128 to the desired locations on the disc(s) 130 during execution of various pending commands, such as the read or write commands in the command queue 108.

The head(s) 128 may be used to write data to and read data from disc(s) 130. The head(s) 128 may include both a write element and a read element. The write element can produce a magnetic field to write a signal to the disc(s) 130 to facilitate storing data thereon. As the disc(s) 130 spin, the write element can store data in narrow concentric data tracks on the disc. Further, the read element can read data from the disc(s) 130 by generating a signal based on detected magnetic transitions stored to the disc(s) 130.

A power consumption grade (PCG) of the HDD 140 can be determined based on the following examples. Generally, a power consumption (PC) of the HDD 140 can be described as:

$$PC = a*(PC_{Idle}) + b*(PC_{I/O})$$

where $PC_{Idle}$ is the power consumed during an idle-mode, $PC_{I/O}$ is the power consumed during an active-mode, and "a" and "b" are factors based on an amount of time spent in idle mode versus active mode. In some embodiments, the factors can be empirically determined by simulation or experiment related to HDD operating conditions. For example, "a" and "b" can be assigned as a=0.8 (80% idle time) and b=0.2 (20% active time).

$PC_{Idle}$ may mainly be contributed to by the spindle motor 132; whereas $PC_{I/O}$ may be mainly contributed to by controller 110 (e.g., a system-on-chip (SoC)) and via other components including the actuator motor 126 and R/W preamp 120 during activities such as a write, read, or other peripheral activities. Therefore, PC can be estimated as:

$$PC_{Idle} \propto PC_{Motor\_Idle}$$

$$PC_{I/O} \propto (PC_{Motor\_I/O}, PC_{SOC}, PC_{Others})$$

Among all components of the HDD 140, the spindle motor 132, SoC chip (which can include the controller 110, channel 118, servo controller 122, buffer 106, interface 104, or any combination thereof), and preamp 120 may be the biggest power consumers that contribute, approximately, >80% of total PC. Some of the HDD's 140 components have large part-to-part PC distributions compared to other components. The large part-to-part PC distributions leads to HDD power consumption variations for similar HDDs. The part-to-part PC distributions of these PC contributors can be gauged based on their component or device-level data, which can form the basis of HDD power consumption grading.

For example, the PC of the spindle motor can be calculated based on the voltage (V) and current (I):

$$PC_{Motor} = I(Amp) \times V(Volt)$$

The voltage is known, such as 12 volts for a 3.5" drive, and the current can be measured in a factory test. An example factory test can measure the current used for a specific spindle motor at idle speed and active speed. Some HDDs may utilize a lower speed (e.g., revolutions per minute (RPM)) for idle speed, and thus reduce $PC_{Motor\_Idle}$ as compared to $PC_{Motor\_I/O}$, while some HDDs may utilize a same speed during idle, which can cause $PC_{Motor\_Idle}$ to be the same or closely comparable to $PC_{Motor\_I/O}$.

$PC_{I/O}$ may be mainly contributed to by the spindle motor 132 ($PC_{Motor\_I/O}$), SoC ($PC_{SOC}$), and other components ($PC_{Others}$, which can include $PC_{Regulator}$, $PC_{VCM\_motor}$, $PC_{Preamp}$, or $PC_{ASIC}$); thus $PC_{I/O}$ can be estimated as:

$$PC_{I/O} = PC_{Motor\_I/O} + PC_{SOC} + PC_{Regulator} + PC_{VCM\_motor} + PC_{Preamp} + PC_{ASIC}$$

$PC_{Motor\_I/O}$ can be determined during factory test as describe above; or it may also be determined in real-time during use of the HDD 140 via sensors. $PC_{Motor\_I/O}$ can be quantified into numerical values which represent the relative PC amount.

$PC_{SOC}$ can be determined based on the SoC current leakage. For example, an SoC manufacturer can gauge the PC of every SoC chip using a 3-level grading: fast (high power), normal (medium power), and slow (low power). Therefore, PC of every SoC can be quantitatively evaluated based on a rating from the manufacturer.

$PC_{Regulator}$ can be determined based on a relative power usage of a voltage regulator. The voltage regulator may regulate voltage for the memory, power ASIC, preamp, or any combination thereof.

$PC_{VCM\_motor}$ can be determined based on a relative power usage of a VCM, such as VCM 126, that can be utilized in active mode to move a head to a specific position during an operation. $PC_{Preamp}$ can be determined based on a relative power usage of a preamp, such as preamp 120, during active operation of the drive. $PC_{ASIC}$ can be determined based on a relative power consumption of a power management circuit, which may be separate or part of an SoC.

In some embodiments, calculation of $PC_{I/O}$ can include other factors ($PC_{Others}$) that may mainly involve write operations, read operations, and seek operations (e.g., power utilized by the coil 126 and preamp 120). In some examples, this factor can be relatively much smaller compared to $PC_{Motor\_I/O}$ and $PC_{SOC}$. Preamp resistance can be measured at the component level before assembly of the HDD 140, and, thus, $PC_{Others}$ can also be based on the preamp power consumption from a component measurement.

From the above, the PC levels of each HDD can be quantitatively gauged in factory and in the field, the PC grading information may increase the value of the HDDs by allowing users to optimize the usage of the HDDs based on the grading information. A HDD manufacturer can characterize and quantify all major component power consumption (PC) contributors, such as based on a PC Pareto analysis, and calculate an overall PC impact factor that represents a relative PC level.

For example, a PC impact factor (PC_IF) at idle-mode can be calculated by:

PC_IF_Idle=1 when $PC_{Motor\_Idle} \leq u-3s$

PC_IF_Idle=2 when $u-3s < PC_{Motor\_Idle} < u+3s$

PC_IF_Idle=3 when $PC_{Motor\_Idle} \geq u+3s$ where u and s are the mean and standard deviation of $PC_{Motor\_Idle}$ which can be calculated based on $PC_{Motor}$ from a factory test. The current (I) in $PC_{Motor}$ may be replaced by a component value for "I" which may be precisely correlated to a device-level "I" and measured for every spindle motor by the spindle motor supplier. PC_IF_Idle numbers can have different values than the above example, but should be able to represent relative power consumption levels.

Figure 4:
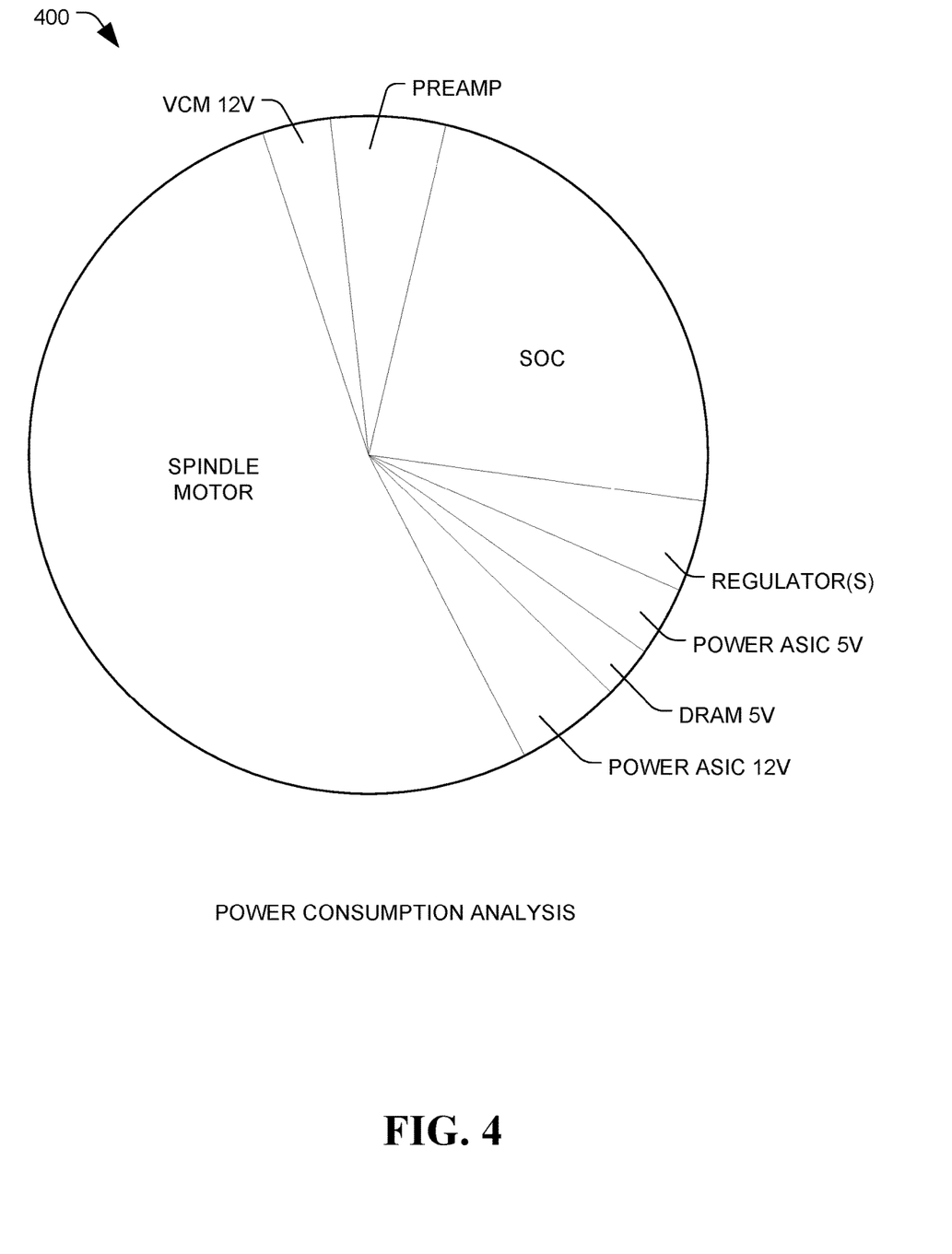
FIG. 4 shows a diagram of a power distribution analysis for an electronic device, in accordance with certain embodiments of the present disclosure.

Further, a PC impact factor at active-mode (PC_IF_I/O) can be determined by:

$$PC\_IF\_I/O = k1*(PC_{Motor\_I/O}) + k2*(PC_{SOC}) + k3*(PC_{Regulator}) + k4*(PC_{VCM\_motor}) + k5*(PC_{Preamp}) + k6*(PC_{ASIC})$$

where k1, k2, k3, k4, k5, and k6 are coefficients representing the power contribution percentage of the respective component. Coefficients can be determined based on an analysis such as shown in FIG. 4.

In some embodiments, contributing factors (CF) can be assigned to each individual component. For example:
For $PC_{Motor\_I/O}$:

CF of $PC_{Motor\_I/O}=1$ when $PC_{Motor\_I/O} \leq u'-3s'$

CF of $PC_{Motor\_I/O}=2$ when $u'-3s' < PC_{Motor\_I/O} < u'+3s'$

CF of $PC_{Motor\_I/O}=3$ when $PC_{Motor\_I/O} \geq u'+3s'$ where u' and s' are the mean and standard deviation of the $PC_{Motor\_I/O}$ distribution.
For $PC_{SOC}$:

CF of $PC_{SOC}=1$ for "Slow" current leakage

CF of $PC_{SOC}=2$ for "Normal" current leakage

CF of $PC_{SOC}=3$ for "Fast" current leakage.

For $PC_{Regulator}$:

CF of $PC_{Regulator}=1$ when $PC_{Regulator} \leq u''-3s''$

CF of $PC_{Regulator}=2$ when $u''-3s'' < PC_{Regulator} < u''+3s''$

CF of $PC_{Regulator}=3$ when $PC_{Regulator} \geq u''+3s''$ where u' and s' are the mean and standard deviation of the PC of the regulator resistance and PC of the regulator=$I^2*V$ or $V^2/R$.
For $PC_{VCM\_motor}$:

CF of $PC_{VCM\_motor}=1$ when $PC_{VCM\_motor} \leq u''-3s''$

CF of $PC_{VCM\_motor}=2$ when $u''-3s'' < PC_{VCM\_motor} < u''+3s''$

CF of $PC_{VCM\_motor}=3$ when $PC_{VCM\_motor} \geq u''+3s''$ where u' and s' are the mean and standard deviation of the PC of the VCM 126 and PC of VCM_motor=I*V, where I and V can be measured at component level or data can be provided by the VCM supplier.
For $PC_{Preamp}$:

CF of $PC_{Preamp}=1$ when $PC_{Preamp} \leq u''-3s''$

CF of $PC_{Preamp}=2$ when $u''-3s'' < PC_{Preamp} < u''+3s''$

CF of $PC_{Preamp}=3$ when $PC_{Preamp} \geq u''+3s''$ where u' and s' are the mean and standard deviation of the PC of the preamp 120 and PC of the preamp=$I^2*R$ or $V^2/R$, where I and R can be measured at component level or data can be provided by the preamp supplier.
For $PC_{ASIC}$:

CF of $PC_{ASIC}=1$ for "Slow" current leakage

CF of $PC_{ASIC}=2$ for "Normal" current leakage

CF of $PC_{ASIC}=3$ for "Fast" current leakage where the current leakage can be gauged by the ASIC supplier. The $PC_{ASIC}$ can indicate a relative power consumption of a power supply circuit, which may be separate or part of an SoC.

Then, the PC impact factor at active-mode, PC_IF_I/O, can be calculated based on the contributing factors:

$$PC\_IF\_I/O = k1*(CF\ of\ PC_{Motor\_I/O}) + k2*(CF\ of\ PC_{SOC}) + k3*(CF\ of\ PC_{Regulator}) + k4*(CF\ of\ PC_{VCM\_motor}) + k5*(CF\ of\ PC_{Preamp}) + k6*(CF\ of\ PC_{ASIC})$$

where k1, k2, k3, k4, k5, and k6 are coefficients representing the power contribution percentage of the respective component. The coefficients can be determined based on an analysis such as shown in FIG. 4.

From these examples, the overall power consumption impact factor, PC_IF_Total, can be calculated based on PC impact factors at idle mode (PC_IF_Idle), active mode (PC_IF_I/O) based on the above equation ($PC = a*(PC_{Idle}) + b*(PC_{I/O})$) to arrive at:

$$PC\_IF\_Total = a*(PC\_IF\_Idle) + b*(PC\_IF\_I/O)$$

Finally, a grade for power consumption based on the calculated PC_IF_Total can be assigned. The grade can be in numbers or symbols representing the relative power consumption levels of each individual unit. For example, A for low PC, B for normal PC, C for high PC.

Figure 2:
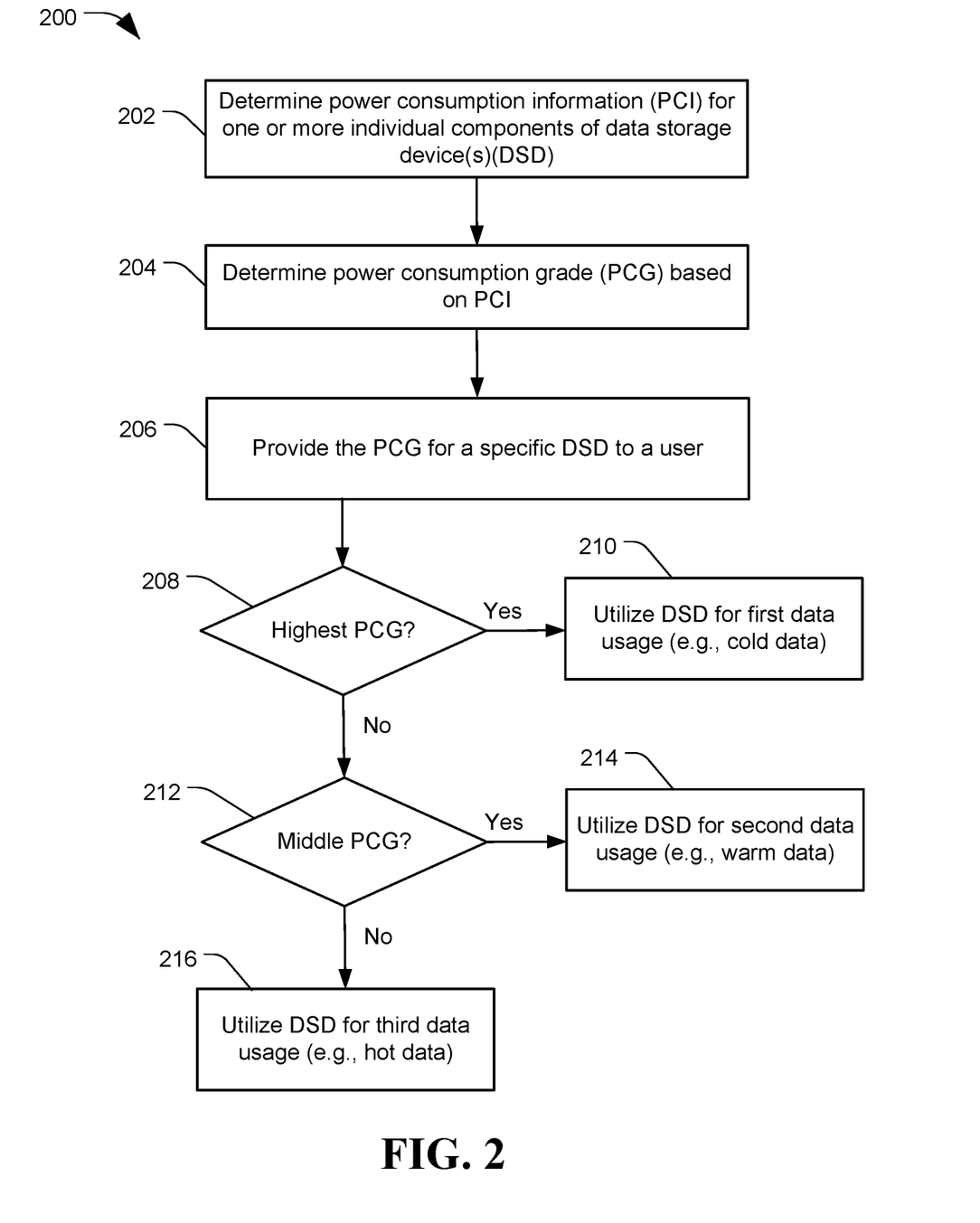
FIG. 2 is a diagram of a process for electronic device power consumption grading, in accordance with certain embodiments of the present disclosure.

Referring to FIG. 2, a method 200 for implementing an electronic device power consumption grade is shown, in accordance with certain embodiments of the present disclosure. The method 200 may be used with data storage devices (DSDs), such as the HDD 140, as well as other electronic devices.

The method 200 can include determining power consumption information (PCI) for one or more individual components of data storage device(s) (DSD), at 202. Examples of PCI for individual components are provided above. A power consumption grade (PCG) can be determined based on the PCI, at 204, and the PCG can be provided to a user of the electronic device, at 206.

The following part of the description will be provided as an example for a DSD, such as HDD 140. Once the user, such as server owner or data center operator, receives the DSD with the PCG, the user may determine how to utilize the DSD within their system(s) based on the PCG.

For example, a DSD with a highest PCG (corresponding to a lowest power usage), at 208, may be utilized for a first priority of data, at 210, such as cold data. Cold data may be data that is accessed less frequently, does not require fast access, or a combination of both.

A DSD with a second or middle PCG (corresponding to a higher power usage than the highest PCG), at 212, may be utilized for a second priority of data, at 214, such as warm data. Warm data may be accessed more frequently than cold data, requires faster access than cold data, or a combination of both.

A DSD with a third or lowest PCG (corresponding to a highest power usage) may be utilized for a third priority of data, at 216, such as hot data. Hot data may be accessed most frequently, requires the fastest access, or a combination of both.

Figure 3:
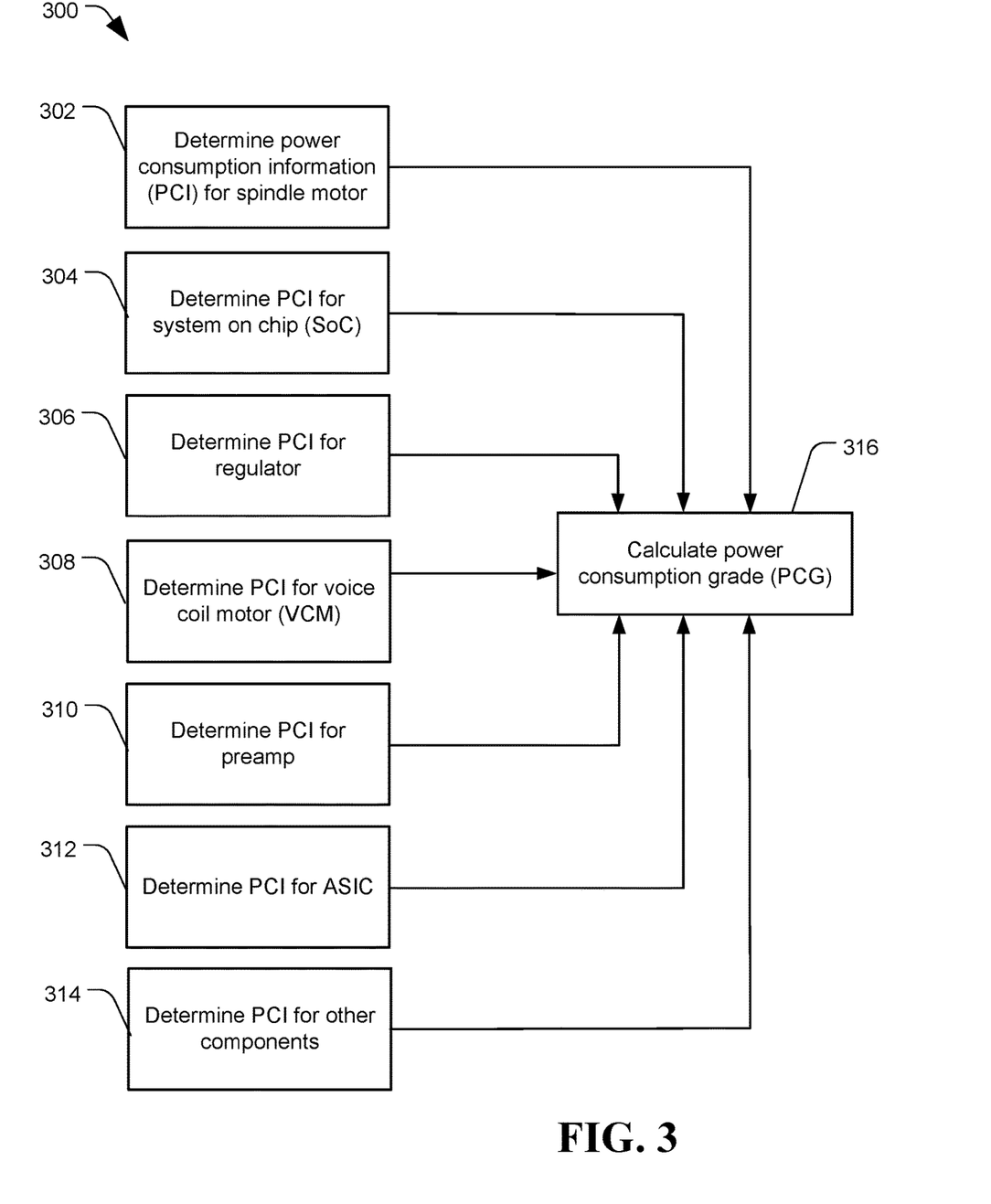
FIG. 3 is a flowchart of a method for electronic device power consumption grading, in accordance with certain embodiments of the present disclosure.

Referring to FIG. 3, a flowchart of a method 300 for electronic device power consumption grading is shown, in accordance with certain embodiments of the present disclosure. The method 300 may combine multiple factors related to an electronic device's hardware power usage to determine a PCG. The method 300 presents an example of a HDD, such as HDD 140 described above.

In some embodiments, the method 300 can include determining power consumption information (PCI) for a spindle motor, at 302, determining PCI for an SoC, at 304, determining PCI for a voltage regulator, at 306, determining PCI for a VCM, at 308, determining PCI for a preamp, at 310, determining PCI for an application specific integrated circuit (ASIC) power chip, at 312, determining PCI for other components, at 312, or any combination thereof. The method 300 may then calculate a PCG for the HDD, at 316.

Referring to FIG. 4, a diagram 400 of a power distribution analysis for an electronic device is provided, in accordance with certain embodiments of the present disclosure. Diagram 400 can be constructed through historical analysis or testing, and can provide ratios of power usage based on components of an electronic device. For example, an HDD's components power distribution is depicted. Such can inform the coefficients discussed above for calculating a PC of a system or a PC impact factor. There are various methods and analysis that can be utilized to determine such a distribution, one example is the Pareto analysis.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments can be made, and other embodiments not specifically described herein will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. A method comprising:
   determining a power consumption indicator for one or more components of an electronic device via power rating equipment during factory testing, including:
   determining an idle power consumption for the one or more components representing power consumption when the electronic device is idle;
   determining an active power consumption for the one or more components representing power consumption when the electronic device is active;
   determining a power consumption grade from the power consumption indicator based on the idle power consumption and the active power consumption, the power consumption grade representing a relative power consumption level of the electronic device; and
   providing the power consumption grade of the electronic device to a user for effective utilization of the electronic device based on the power consumption grade.

2. The method of claim 1 further comprising the electronic device is a hard disc drive.

3. The method of claim 2 further comprising the one or more components include a spindle motor configured to rotate a data storage disc, and the power consumption indicator includes a determination of the power consumption of the spindle motor during an active state of the hard disc drive.

4. The method of claim 3 further comprising the power consumption indicator includes a determination of the power consumption of the spindle motor during an idle state of the hard disc drive.

5. The method of claim 3 further comprising the one or more components include a system-on-chip (SoC) having a data storage controller, and the power consumption indicator includes a determination of the power consumption of the SoC.

6. The method of claim 3 further comprising the one or more components include a voice coil motor (VCM) configured to position a read/write head over a desired area of the data storage disc, and the power consumption indicator includes a determination of the power consumption of the VCM.

7. The method of claim 3 further comprising the one or more components include a preamplifier configured to amplify a write signal to store data to the data storage disc, and the power consumption indicator includes a determination of the power consumption of the preamp.

8. The method of claim 3 further comprising the one or more components include an application specific integrated circuit (ASIC) configured to provide power to one of the components, and the power consumption indicator includes a determination of the power consumption of the ASIC.

9. The method of claim 3 further comprising the one or more components include a voltage regulator configured to regulate a voltage supply to one of the components, and the power consumption indicator includes a determination of the power consumption of the regulator.

10. The method of claim 1 further comprising receiving the power consumption grade at the user and implementing a usage of the electronic device based on the power consumption grade.

11. A method comprising:
    receiving an electronic device with a power consumption grade from a supplier, the power consumption grade indicating a relative power consumption level of the electronic device based on idle power consumption and active power consumption of one or more components of the electronic device; and
    implementing a usage of the electronic device based on the power consumption grade, including distributing data processing loads among multiple electronic devices based on corresponding power consumption grades.

12. The method of claim 11 further comprising the electronic device is a data storage device.

13. The method of claim 12 further comprising the data storage device is a hard disc drive.

14. The method of claim 12 further comprising implementing a data storage device with a highest power consumption grade for use with cold data, the highest power consumption grade indicating a relatively low power usage as compared to a lower power consumption grade.

15. The method of claim 14 further comprising implementing a data storage device with a lowest power consumption grade for use with hot data, the lowest power consumption grade indicating a relatively high power usage as compared to the highest power consumption grade.

16. A method comprising:
    determining a power consumption grade representing a relative power consumption level of an electronic device via factory testing using power rating equipment, including:
        determining power consumption information of one or more individual components of the electronic device, by:
            measuring an idle power consumption for the one or more individual components representing power consumption when the electronic device is idle;
            measuring an active power consumption for the one or more individual components representing power consumption when the electronic device is active;
        determining the power consumption grade from the power consumption information; and
    providing the power consumption grade to a user of the electronic device such that the user can optimize an implementation of the electronic device based on the power consumption grade.

17. The method of claim 16 further comprising the electronic device is a data storage device and the one or more individual components include a system-on-chip (SoC).

18. The method of claim 17 further comprising the data storage device is a hard disc drive and the one or more components include a spindle motor.

19. The method of claim 18 further comprising the one or more components include a preamplifier and a voice coil motor (VCM).

20. The method of claim 16 further comprising:
    determining the power consumption information for a plurality of components of the electronic device;
    applying a coefficient to the power consumption information for each of the plurality of components representing a power contribution percentage of each respective component; and
    determining the power consumption grade based on the coefficients and the power consumption information.

* * * * *